United States Patent
Kimura (10) Patent No.: US 9,961,268 B2
(45) Date of Patent: May 1, 2018

(54) CONTROL DEVICE, IMAGING SYSTEM, CONTROL METHOD, AND PROGRAM FOR CONTROLLING IMAGING UNIT ACCORDING TO IMAGE CAPTURING DIRECTION AND ZOOM MAGNIFICATION

(71) Applicant: CANON KABUSHIKI KAISHA, Tokyo (JP)

(72) Inventor: Takumi Kimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 62 days.

(21) Appl. No.: 14/929,063

(22) Filed: Oct. 30, 2015

(65) Prior Publication Data

US 2016/0142639 A1  May 19, 2016

(30) Foreign Application Priority Data

Nov. 14, 2014  (JP) .................. 2014-232192

(51) Int. Cl.
*H04N 5/232* (2006.01)
*H04N 5/262* (2006.01)
*G06K 9/32* (2006.01)

(52) U.S. Cl.
CPC ........... *H04N 5/23296* (2013.01); *G06K 9/32* (2013.01); *H04N 5/23206* (2013.01); *H04N 5/2628* (2013.01)

(58) Field of Classification Search
CPC ........... H04N 5/23296; H04N 5/23206; H04N 5/23274; H04N 5/23251; H04N 5/2628; G06K 9/32
See application file for complete search history.

(56) References Cited

U.S. PATENT DOCUMENTS

| | | | | |
|---|---|---|---|---|
| 6,985,178 B1* | 1/2006 | Morita | .................. | G06T 1/0007 348/207.11 |
| 7,623,152 B1* | 11/2009 | Kaplinsky | ............... | G06T 7/254 348/155 |
| 8,284,268 B2* | 10/2012 | Imata | .................. | H04N 5/23203 348/211.8 |
| 2004/0008773 A1* | 1/2004 | Itokawa | ................ | G01S 3/7864 375/240.08 |
| 2008/0291271 A1* | 11/2008 | Hansson | .......... | G08B 13/19684 348/143 |
| 2009/0102920 A1* | 4/2009 | Yamanaka | ............. | G03B 13/00 348/143 |
| 2015/0042812 A1* | 2/2015 | Tang | .................. | H04N 5/23206 348/157 |
| 2016/0094790 A1* | 3/2016 | Yu | ......................... | G01S 3/7864 348/169 |

FOREIGN PATENT DOCUMENTS

JP  2009-130878 A  6/2009

* cited by examiner

*Primary Examiner* — Twyler Haskins
*Assistant Examiner* — Akshay Trehan
(74) *Attorney, Agent, or Firm* — Canon USA Inc., IP Division (57) ABSTRACT

On a display screen of a display unit which displays an image captured by an imaging unit, the image capturing direction and the zoom magnification for a specified imaging region to be captured by the imaging unit are determined. If the determined image capturing direction is out of a range of the image capturing direction of the imaging unit that can be changed, the zoom magnification of the imaging unit is restricted to be lower than the zoom magnification determined in the determination.

15 Claims, 8 Drawing Sheets

CONTROL DEVICE, IMAGING SYSTEM, CONTROL METHOD, AND PROGRAM FOR CONTROLLING IMAGING UNIT ACCORDING TO IMAGE CAPTURING DIRECTION AND ZOOM MAGNIFICATION

BACKGROUND OF THE INVENTION

Field of the Invention

The present invention relates to a process for controlling an imaging region of an imaging device.

Description of the Related Art

In a conventionally known network camera system, such as a security or surveillance system, a camera transmits an image captured by the camera to a terminal device through a network. To control the specific area, object or target being imaged, an image capturing direction (angle) or a zoom value (magnification or focal length) of the camera is changed in accordance with an instruction from the terminal device.

Japanese Patent Application Laid-Open No. 2009-130878 has disclosed a technique for controlling, if a user has specified any rectangular region on a captured image on a display screen of a terminal device, the zoom value of a camera so that the captured image in the specified region is magnified.

First, upon the specification of a region on the captured image by the user, the image capturing direction of the camera is changed so that a subject in the specified region comes to the center of the captured region of the camera. Next, the zoom value of the camera is increased to magnify the display of the image of the subject in the center of the captured image after the image capturing direction is changed. For example, the zoom value is determined so that the captured image in the user specified region comes to be displayed on the entire screen of the area for displaying the captured image. In the technique according to Japanese Patent Application Laid-Open No. 2009-130878, the zoom value is determined based on the dimension ratio between the display region of the captured image and the region selected by the user.

Further, Japanese Patent Application Laid-Open No. 2009-130878 describes the restriction of the zoom value of the camera in accordance with a misalignment amount between the optical axis of the zoom lens and the center of the imaging element caused in the assembly of the imaging element and the zoom lens to the camera.

In the technique according to Japanese Patent Application Laid-Open No. 2009-130878, however, if the zooming process is performed while the camera captures an image in a particular direction, the subject within the user selected region may not be displayed partly or entirely on the display screen after the zooming process.

Description is made of an example in which the center of a user specified region on the captured image does not coincide with the center of the image capturing direction of the camera because the movable range of the mechanism that changes the image capturing direction of the camera is physically restricted. In such a case, the center of the captured image displayed on the terminal device before the zooming does not coincide with the center of the user selected region on the captured image if zooming.

If the zooming process of the camera is performed, the subject in the center of the captured image is magnified and another subject apart from the center of the captured image is cut out of the display screen (not shown). If the center of the user selected region is apart from (not aligned with) the center of the captured image before the zooming, when the zooming process of the camera is performed, the subject included in the selected region may not be displayed on the display screen at all.

SUMMARY OF THE INVENTION

An aspect of the present invention is directed to a control device that includes: a determination unit configured to determine an image capturing direction and a zoom magnification for a specified imaging region to be captured by an imaging unit on a display screen of a display unit which displays an image captured by the imaging unit; and a control unit configured to, if the determined image capturing direction is out of a range of the image capturing direction of the imaging unit that can be changed, restrict the zoom magnification of the imaging unit to be a zoom magnification lower than the zoom magnification determined by the determination unit.

Further features of the present invention will become apparent from the following description of exemplary embodiments (with reference to the attached drawings).

DESCRIPTION OF THE EMBODIMENTS

Embodiments of the present invention are hereinafter described with reference to the attached drawings.

Figure 1:
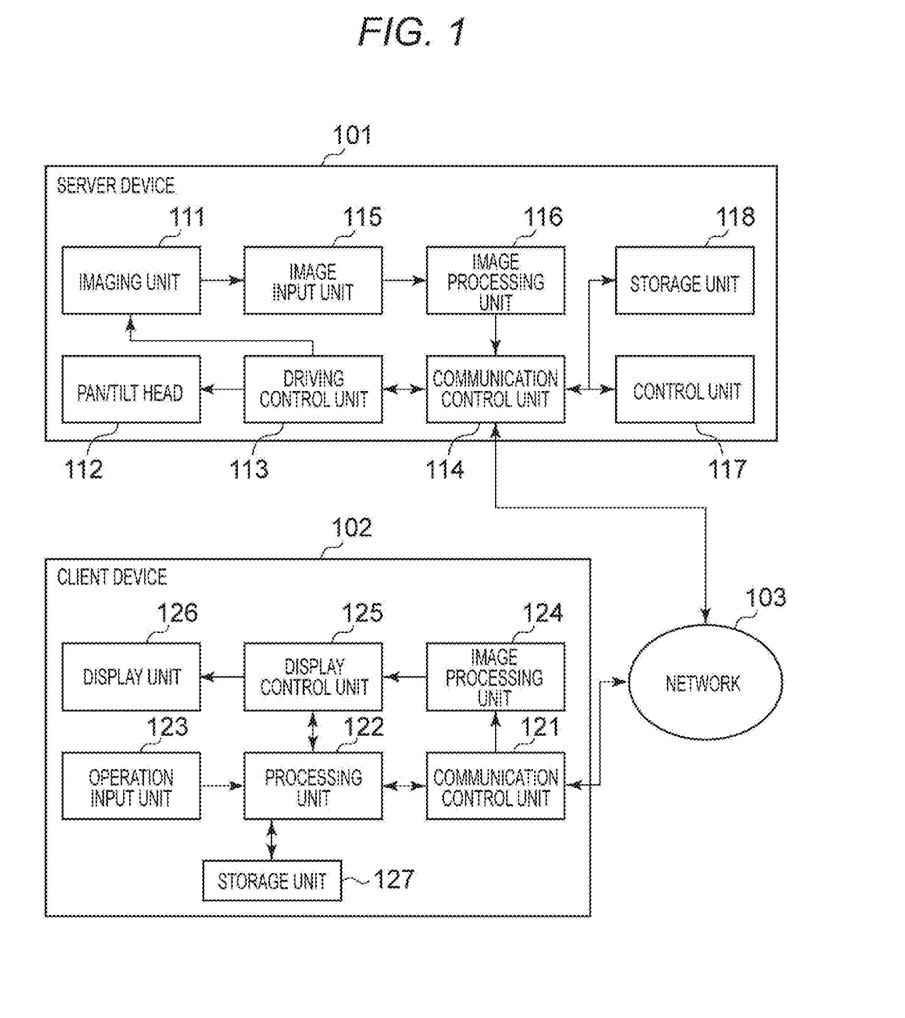
FIG. 1 illustrates a functional block diagram of a networked imaging system according to a first embodiment.

A structure of a network camera system (imaging system) according to this embodiment is described with reference to FIG. 1. In this embodiment, a server device 101 and a client device 102 are connected through a network 103.

The sever device 101 transmits an image captured by an imaging unit 111 to the client device 102 through the network 103. The imaging unit 111 includes a lens unit including a zoom lens and a focal lens, an image sensor, and the like. In this embodiment, the server device 101 incorporates the imaging unit 111; however, the present invention is not limited thereto. An external imaging device including the imaging unit 111 and a pan/tilt head 112 may be connected to the server device 101 and the server device 101 may control to change the image capturing direction and the viewing angle of the imaging device. In this embodiment, the viewing angle refers to the size of a region photographed by the imaging unit 111 in one image capturing direction. The imaging unit 111 can change the viewing angle by changing the zoom value.

For example, the viewing angle is an angle formed by a first line connecting the upper right vertex of the rectangular imaging region captured by the imaging unit 111 in a certain image capturing direction and the center of the lens unit of the imaging unit 111, and a second line connecting the upper left vertex of the imaging region and the center of the lens unit. In this embodiment, the imaging unit 111 can have a large viewing angle when the focal length of the lens unit is shortened by changing the zoom value. In this embodiment, the imaging unit 111 can have a small viewing angle when the focal length of the lens unit is extended by changing the zoom value.

In this embodiment, the zoom value refers to a value expressing how much the image is zoomed in a telephoto direction from the state in which the imaging unit 111 photographs at the wide angle end. By changing the magnification at which the currently photographed imaging region is zoomed (zoom magnification), the zoom value of the imaging unit 111 can be changed. When the zoom value is large, the imaging region (area) captured by the imaging unit 111 becomes narrow. In contrast, when the zoom value is small, the imaging region (area) captured by the imaging unit 111 becomes large. Increasing the zoom value corresponds to changing the zoom in the telephoto-end (tele) direction. Decreasing the zoom value corresponds to changing the zoom in the wide-angle-end (wide) direction. Accordingly, depending on a zooming range from tele to wide, the imaging region (area) captured by the imaging unit 111 will correspondingly have a range of sizes from smallest to largest.

The client device 102 displays the captured image received from the server device 101 on a display unit 126. In accordance with the instruction input by a user through an operation input unit 123, the client device 102 outputs a control signal to the server device 101 through the network 103. The control signal is a signal for controlling the image capturing direction, the viewing angle, and the like of the imaging unit 111. The client device 102 may be, for example, a personal computer (PC) or a portable terminal such as a tablet terminal or a smartphone.

The network 103 may be, for example, the Internet, a wired local area network (LAN), a wireless LAN, or a wide area network (WAN), or may be achieved by an analog cable or the like. The communication specification, the scale, and the configuration of the network 103 are not particularly limited. The communication specification of the LAN may be, for example, Ethernet (registered trademark). In this embodiment, TCP/IP (UDP/IP) protocol is used as the network protocol. In the description below, the address refers to the IP address. The IP address is assigned to the server device 101 and the client device 102. The network 103 may have a plurality of server devices 101 and a plurality of client devices 102 connected thereto.

Next, the structure of the server device 101 is described specifically. The imaging unit 111 captures an image of a subject and generates an image signal. The imaging unit 111 includes, for example, a lens and an imaging element such as a complementary metal oxide semiconductor (CMOS). The imaging element converts the image of the subject formed by the lens into an image signal. The imaging unit 111 changes the focal length by operating the lens unit in accordance with an instruction from a driving control unit 113, which is described below, to change the viewing angle of the camera. In other words, the imaging unit 111 can change the imaging region of the camera by changing the zoom value.

The pan/tilt head 112 is driven in accordance with the instruction of the driving control unit 113 to control the image capturing direction of the imaging unit 111. In this embodiment, the pan/tilt head 112 can change the image capturing direction of the imaging unit 111 in a pan direction and a tilt direction. The pan/tilt head 112 according to this embodiment can change the image capturing direction of the imaging unit 111 but in the limited range as described below.

The driving control unit 113 controls the image capturing direction and the viewing angle of the imaging unit 111 in accordance with the control of a control unit 117, which is described below. The driving control unit 113 controls the pan/tilt head 112 to change the image capturing direction of the imaging unit 111 in the pan direction or the tilt direction. The driving control unit 113 moreover controls the imaging unit 111, specifically controls the viewing angle of the imaging unit 111. The driving control unit 113 may be, for example, a processor such as a central processing unit (CPU). When the driving control unit 113 is a processor, for example, the driving control unit 113 controls the imaging unit 111 by executing a program stored in a storage unit 118 as described below.

An input unit 115 acquires the captured image from the imaging unit 111 and outputs the image to an image processing unit 116, which is described below. If the input unit 115 acquires the images containing 30 frames in one second, the input unit 115 can acquire the moving image of 30 fps (frame per second).

The image processing unit 116 performs image processing on the image signal generated by the imaging unit 111. The image processing unit 116, for example, encodes and compresses the captured image captured by the imaging unit 111. In this embodiment, the image processing unit 116 takes in an NTSC image signal from the imaging unit 111 and performs A/D conversion thereon. After that, the image processing unit 116 compresses the signal and outputs the signal to a communication control unit 114. The image processing unit 116 may be, for example, a processor such as a CPU or a processor for image processing, such as a graphics processing unit (GPU).

The communication control unit 114 outputs the captured image, which is output from the image processing unit 116, to the client device 102 through the network 103. The communication control unit 114 receives a command for controlling the server device 101 from the client device 102. The command for controlling the sever device 101 includes a command for changing the image capturing direction of the imaging unit 111 to a predetermined direction and a command for changing the viewing angle of the imaging unit 111 to a predetermined viewing angle.

The communication control unit 114 accepts from the client device 102, the specification of the specified region in the range where the imaging unit 111 can capture an image after changing the image capturing direction. As can be understood from the example illustrated in FIG. 2A, the communication control unit 114 may accept the specification of at least a part of the imaging region corresponding to the captured image captured by the imaging unit 111.

The control unit 117 controls the operation of each structure of the server device 101. In this embodiment, the control unit 117 controls the operation of each structure of the server device 101 by analyzing the command received from the client device 102. The control unit 117 may be, for example, a processor such as a CPU. If the control unit 117 is a processor, the control unit 117 controls the structures of the server device 101 by executing the programs stored in the storage unit 118, which is described below. Note that the hardware structure for the driving control unit 113, the communication control unit 114, and the control unit 117 may be one processor or may be a plurality of processors.

The storage unit 118 holds the setting values and pieces of data of the server device 101. If the control unit 117 is a processor, the storage unit 118 holds the programs to be executed by the control unit 117. The storage unit 118 may be, for example, random access memory (RAM) or read-only memory (ROM), or a recording medium such as a hard disk drive (HDD). The storage unit 118 may be a removable medium such as a flash memory or a memory card.

Next, the structure of the client device 102 is described. The client device 102 may include a normal personal computer or a mobile terminal device. The communication control unit 114 is connected to the server device 101 by specifying the IP address assigned to the server device 101.

The communication control unit 121 receives the captured image from the server device 101. In accordance with the instruction input from the operation input unit 123, which is described below, the communication control unit 121 outputs the command for controlling the server device 101 to the server device 101. The communication control unit 121 receives a response from the server device 101 relative to the command transmitted to the server device 101. The response from the server device 101 includes the parameters requested from the client device 102 to the server device 101 and the information representing whether the command has been executed in the server device 101.

A processing unit 122 generates a command for controlling the server device 101 and outputs the command to the server device 101 through the communication control unit 121 in accordance with the instruction input to the operation input unit 123. The processing unit 122 analyzes the response received from the server device 101.

The processing unit 122 may be, for example, a processor such as a CPU. If the processing unit 122 is a processor, for example, the processing unit 122 controls the structures of the client device 102 by executing the programs stored in a storage unit 127, which is described below.

The storage unit 127 holds the setting values and the pieces of data of the client device 102. If the processing unit 122 is a processor, the storage unit 127 holds the programs to be executed by the processing unit 122. The processing unit 122 may be a memory such as RAM or ROM, or a recording medium such as an HDD. The storage unit 127 may be a removable medium such as a flash memory or a memory card.

The operation input unit 123 inputs the user operation to the client device 102. In this embodiment, the operation input unit 123 generates the graphical user interface (hereinafter, GUI) using the captured image, which is received from the server device 101 and developed in an image processing unit 124 to be described below, or using a panorama image generated using the captured image. Then, the generated GUI is displayed on the display unit 126 as described below.

In this embodiment, the operation input unit 123 inputs an instruction for changing the image capturing direction or the viewing angle of the imaging unit 111 on the basis of the operation relative to the GUI using a keyboard or a pointing device such as a mouse or a touch panel. In this embodiment, the operation input unit 123 accepts the specification of the specified region in the range where the image capture is possible by changing the image capturing direction of the imaging unit 111. For example, the specification of the region in the image currently captured by the imaging unit 111 to be magnified and displayed is accepted. Moreover, the operation input unit 123 can input various parameters for setting the server device 101.

The image processing unit 124 performs the image processing on the captured image that the communication control unit 121 has received from the server device 101. For example, the image processing unit 124 decodes the captured image encoded in the server device 101. The captured image having been subjected to the image processing by the image processing unit 124 is output to a display control unit 125.

The display control unit 125 displays the captured image acquired from the image processing unit 124 or the GUI generated by the operation input unit 123 on the display unit 126. The display control unit 125 may be, for example, a processor such as a CPU. The display control unit 125 may be integrated with the processing unit 122.

The display unit 126 corresponds to a display with a screen to show the captured image acquired from the image processing unit 124 or the GUI generated by the operation input unit 123. For example, the display unit 126 is formed by a liquid crystal display or the like. The display unit 126 may be provided outside the client device 102, connected to the client device 102, and display the image under the control of the client device 102.

Figure 2A:
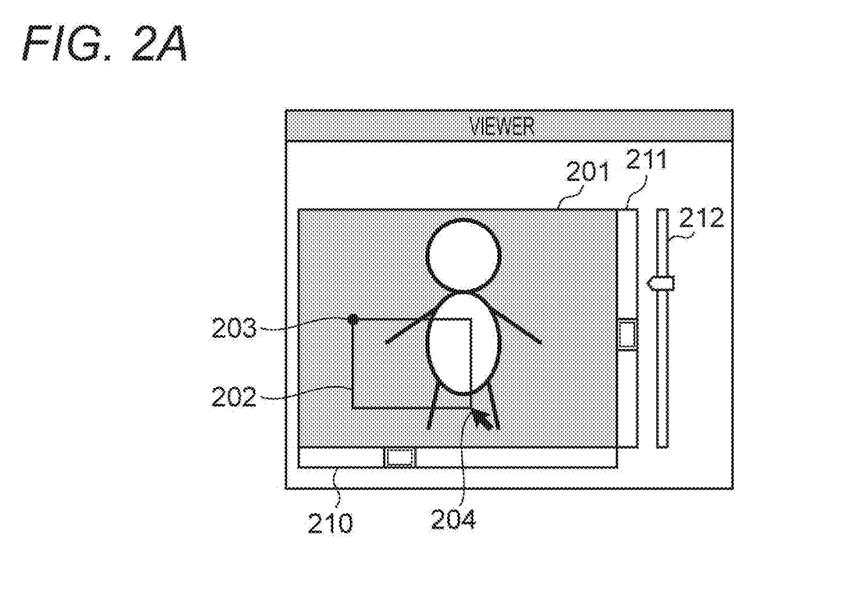
FIGS. 2A and 2B illustrate an example of a user interface according to the first embodiment.

An example of the GUI displayed on the screen of the display unit 126 is described with reference to FIG. 2A and FIG. 2B. First, an example of the operation instruction to the server device 101 through the GUI is described with reference to FIG. 2A.

A slide bar 210 corresponds to the GUI for instructing to change the image capturing direction of the imaging unit 111 in the pan direction. A slide bar 211 corresponds to the GUI for instructing to change the image capturing direction of the imaging unit 111 in the tilt direction. A slide bar 212 corresponds to the GUI for instructing to change the viewing angle of the imaging unit 111.

A display region 201 is a region on the display screen where the captured image received from the server device 101 is displayed. In this embodiment, a user can specify a point on the display region 201 using a keyboard, a mouse, a touch panel, or the like.

In this embodiment, the user specifies two points on the display region 201, thereby selecting a part of the captured image on the display region 201. In the example of FIG. 2A, the user selects a first point 203 and a second point 204 to specify a rectangular region. The rectangular region has its diagonal line formed by a line connecting the first point and the second point. In this manner, the user can specify the position and the size of the specified region. On the display region 201, a frame representing a user specified region 202 can be displayed.

How to specify the region of the captured image on the display region 201 and what kind of shape the specified region has are not limited to those described in the above example. The shape of the specified region may be, other than the rectangular shape, a circular or any other polygonal shape. If the region to be specified is a polygon, for example, the position of each vertex is specified. If the region to be specified is a circular shape, the center of the circle and the radius are specified. Alternatively, a predetermined shape may be dragged to the display region 201. Further alternatively, a mouse pointer or a user's finger may be moved on the display region 201 to specify an arbitrary shape for the region 202. Further alternatively, the user may input the value representing the length of the region in the pan direction, the value representing the length thereof in the tilt direction, and the coordinates representing the positions of the vertex, the center, or the particular point for specifying the region.

In this embodiment, the specified region is in the range of the captured image that is currently captured by the imaging unit 111. However, the present invention is not limited thereto. The user may specify the region on an image representing the range where the image capture is possible by changing the image capturing direction and the viewing angle of the imaging unit 111. The image representing the range where the image capture is possible by changing the image capturing direction and the viewing angle of the imaging unit 111 may be, for example, a panorama image on the operation screen or a map image indicating the range where the image capture of the imaging device is possible. In this manner, the specification of the imaging region to be captured by the imaging unit 111 capable of changing the zoom value and the image capturing direction can be accepted.

Figure 2B:
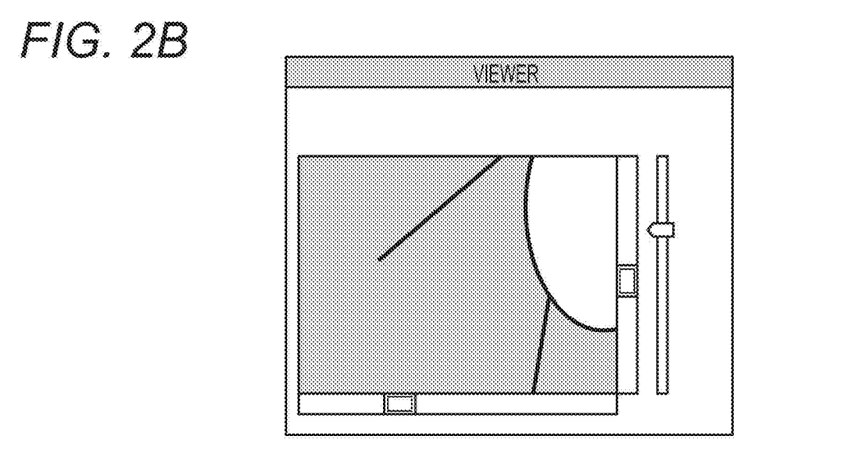

Next, description is made of a process for controlling the viewing angle of the imaging unit 111 in accordance with the user's specification of the region with reference to FIG. 2B.

In this embodiment, by specifying the region on the captured image on the display region, the user can instruct the server device 101 to zoom-in the specified region and capture the image. For example, if the user selects the point 203 and the point 204 on the captured image displayed on the display region 201 to specify the specified region 202 in FIG. 2A, the client device 102 transmits the coordinate information of the specified region to the server device 101. This coordinate information is expressed by the pan angle and the tilt angle. Based on the coordinate information from the client device 102, the server device 101 controls the image capturing direction and the viewing angle (zoom value) of the imaging unit 111. As a result, the image of the specified region is displayed on the entire display region 201 as illustrated in FIG. 2B. The frame representing the specified region 202 displayed in the display state in FIG. 2A is no longer displayed in the display state in FIG. 2B.

The aspect ratio of the user specified region 202 (for example, the ratio between the viewing angle in the pan direction and the viewing angle in the tilt direction) does not necessarily coincide with the aspect ratio of the display region 201. Moreover, the aspect ratio of the user specified region 202 does not necessarily coincide with the aspect ratio of the captured image obtained by the imaging unit 111. In view of this, in this embodiment, the imaging unit 111 is instructed to capture a region with the aspect ratio corresponding to the aspect ratio of the captured image captured by the imaging unit 111 or the display region 201, the region corresponding to the region containing at least a part of the user specified region. The process for converting the information on the user specified region into the information on the region to be captured by the imaging unit 111 can be executed by the processing unit 122 of the client device 102 or the control unit 117 of the server device 101.

Figure 6A:
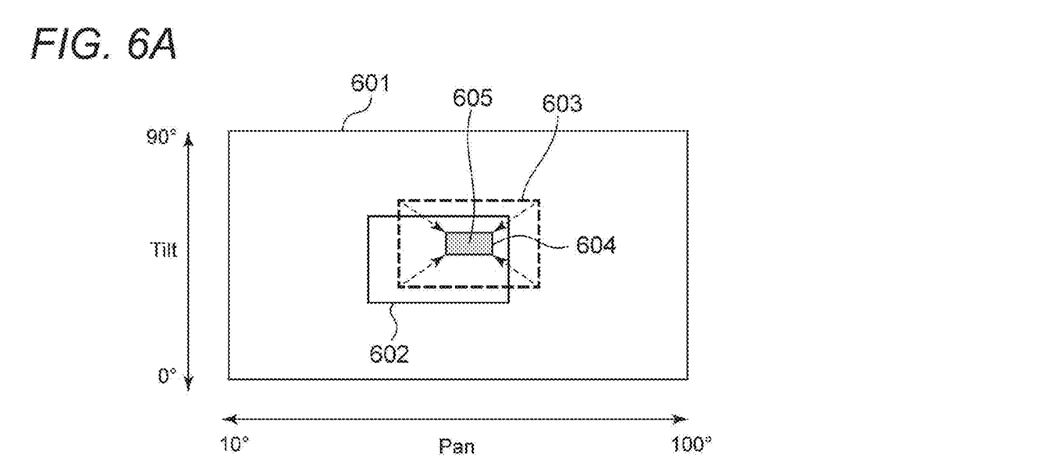
FIGS. 6A and 6B are diagrams for describing a zooming process to be performed by the control device according to the first embodiment.
Figure 6B:
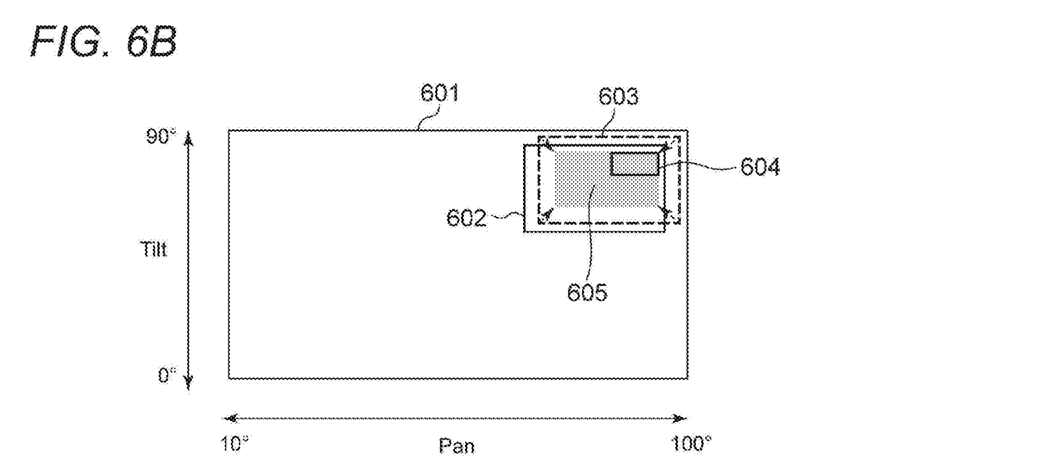

Here, description is made of the zoom control (viewing angle control) of the imaging unit 111 in accordance with the user specification of the region with reference to FIG. 6A and FIG. 6B. In FIG. 6A, an imaging range 601 corresponds to a range where the imaging is possible by changing the image capturing direction and the viewing angle (or zoom value) of the imaging unit 111. In the example of FIG. 6A, the image capturing direction of the imaging unit 111 can be changed in the pan direction in the pan-angle range of 10° to 100° with the operation of the pan/tilt head 112. In the example of FIG. 6A, the image capturing direction of the imaging unit 111 can also be changed in the tilt direction in the tilt-angle range of 0° to 90° with the operation of the pan/tilt head 112. Note that the image capturing direction is determined with respect (in reference) to the center of the current imaging range (pan-tilt angles).

In FIG. 6A, an imaging region 602 illustrated with a solid line represents the imaging region (photographing viewing angle) of the imaging unit 111 before the zooming process. An imaging region 603 illustrated with a dotted line represents the imaging region of the imaging unit 111 after the image capturing direction of the imaging unit 111 is changed. A specified region 604 represents the specified region specified by the user on the display region 201 while the captured image corresponding to the imaging region 602 is displayed on the display region 201 illustrated in FIG. 2A. An imaging region 605 painted in gray represents a region to display an image with a size of the display region 201 after the zooming process.

For example, the center of the imaging region 602 before the zooming process is in the position at a pan angle of 60° and a tilt angle of 50°. The center of the imaging region 602 is at the point corresponding to the intersection between the diagonal lines of the imaging region 602.

The center of the user specified region 604 is at the position with a pan angle of 65° and a tilt angle of 55°. The center of the specified region 604 is at the point corresponding to the intersection between the diagonal lines of the imaging region 604.

The user's specifying of the specified region 604 causes a change in the image capturing direction so that the center of the imaging region 603 after the movement (pan-tilt movement) of the imaging unit 111 coincides with the center of the specified region 604. In the example of FIG. 6A, the center of the imaging region 603 after the movement is at the position with a pan angle of 65° and a tilt angle of 55°, and thus the image capturing direction is changed so that the center of the imaging region 602 (before zooming) becomes the center of the imaging region 603 (after zooming) and therefore coincides with the center of the specified region 604.

Next, the zoom value of the imaging unit 111 is changed to adjust the viewing angle so that the imaging region 605 is captured. In this manner, the imaging unit 111 is operated to zoom in the captured image in the specified region 604. The zoom value is determined based on the size of the imaging region 603 before the zooming and the size of the specified region 604. In this embodiment, the zoom magnification is determined based on the size of the imaging region 603 before the zooming and the size of the specified region 604. The zoom magnification refers to the ratio between the current zoom value and the zoom value after the change. Based on the determined zoom magnification, the zoom value after the change is determined. With the thusly determined first zoom value, the viewing angle of the imaging unit 111 is controlled to be a first viewing angle so that the size of the imaging region of the imaging unit 111 corresponds to the size of the specified region 604.

Figure 7:
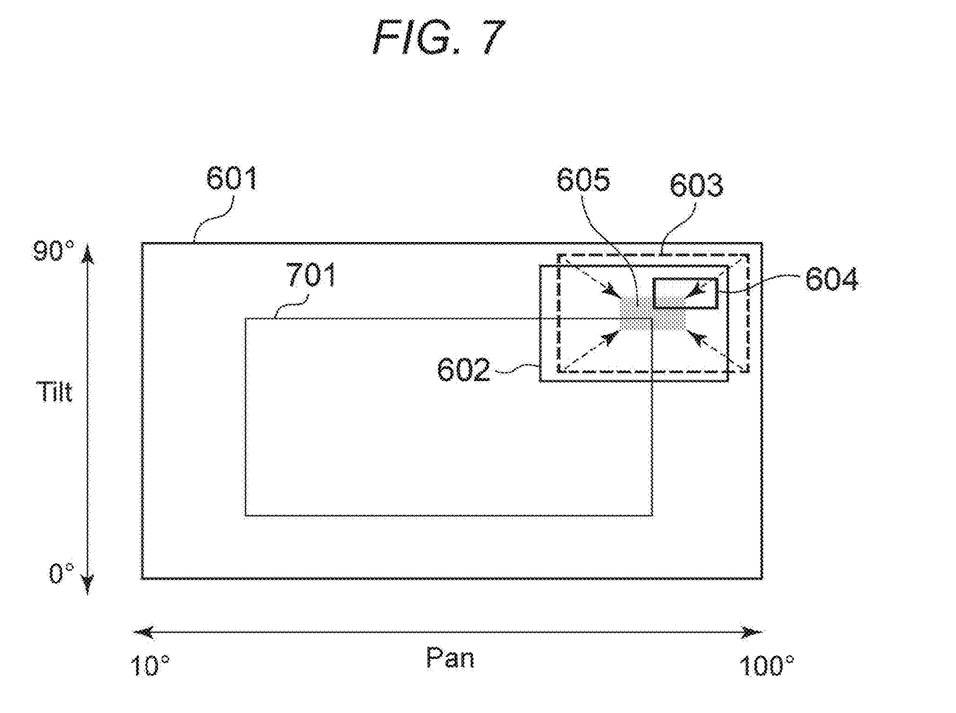
FIG. 7 is a diagram for describing a zooming process according to the first embodiment.

If a particular point in the specified region (for example, the center of the specified region) is included in a predetermined region in the imaging range 601, the zooming process with the zoom value determined as above may cause the specified region 604 to go out of the imaging region after the zooming due to the physical restriction on the driving in the pan-tilt directions. With reference to FIG. 7, description is made of the case in which the specified region 604 is out of the range where the image capturing direction can be changed. A region 701 illustrated in FIG. 7 is a region in the imaging range where the optical axis of the imaging unit 111 can be directed by changing the image capturing direction of the imaging unit 111. That is to say, the frame of the region 701 corresponds to the center of the imaging region to be captured when the image capturing direction of the imaging unit 111 is changed to the end. In other words, the image capturing direction of the imaging unit 111 cannot be changed so that the center of the imaging region is contained in the region outside the region 701.

In the example of FIG. 7, the center of the imaging region 602 before the zooming is at the position with a pan angle of 85° and a tilt angle of 75°, and the center of the user specified region 604 is at the position with a pan angle of 95° and a tilt angle of 85°. Moreover, in the example of FIG. 7, the imaging unit 111 can move the center of the imaging region 603 to the position at a pan angle of 90° and a tilt angle of 80° at the maximum.

In the example of FIG. 7, the image capturing direction of the imaging unit 111 is changed for the zooming process but the center of the imaging region 603 after the movement cannot be made coincide with the center of the specified region 604. In a manner similar to the example illustrated in FIG. 6A, the viewing angle of the imaging unit 111 is changed at the zoom value determined based on the size of the specified region 604 and the size of the imaging region 603 before the zooming, after the image capturing direction is changed to the end of the pan angle and the tilt angle in the possible range. Then, as illustrated in FIG. 7, a part of the specified region 604 is no longer included in the imaging region 605 after the zooming or the specified region 604 is no longer included in the imaging region 605 after the zooming.

In view of the above, in this embodiment, the zooming control of the imaging unit 111 as illustrated in FIG. 6B is performed if the particular point in the specified region (for example, the center of the specified region) is not included in the predetermined region (for example, region 701).

In other words, the viewing angle of the imaging unit 111 is controlled to be a second viewing angle in which the specified region 604 is included after the image capturing direction of the imaging unit 111 is moved so that the imaging region 603 is captured from the state in which the imaging region 602 is captured. The second viewing angle is larger than the first viewing angle described with reference to FIG. 6A. The first viewing angle of the imaging unit 111 can be set to the second viewing angle by restricting the zoom value of the imaging unit 111 to be the second zoom value smaller than the first zoom value, which is described with reference to FIG. 6A. The second viewing angle and the second zoom value are determined based on the position of the specified region 604 in the range where the imaging of the imaging unit 111 is possible as described with reference to FIG. 4 and FIG. 5A to FIG. 5C.

If the imaging unit 111 cannot capture the image of a part of the specified region after the imaging region of the imaging unit 111 is changed using the first zoom value determined based on the size of the specified region and the size of the currently captured imaging region, the viewing angle of the imaging unit 111 is changed using the second zoom value. The currently captured imaging region refers to the region corresponding to the captured image currently displayed in the display region 201. If the imaging unit 111 cannot capture the entire specified region after the imaging region of the imaging unit 111 is changed using the first zoom value determined based on the size of the specified region and the size of the currently captured imaging region, the zoom magnification is restricted to be the second zoom value.

In this manner, even if the center of the imaging region 603 to be captured by the imaging unit 111 cannot be made coincide with the center of the specified region 604, the subject within the specified region 604 can be displayed in the display region 201 in the zooming process. This enables a user to view the intended image.

The zooming process illustrated in FIGS. 6A and 6B is described with reference to the flowchart of FIG. 3.

Figure 3:
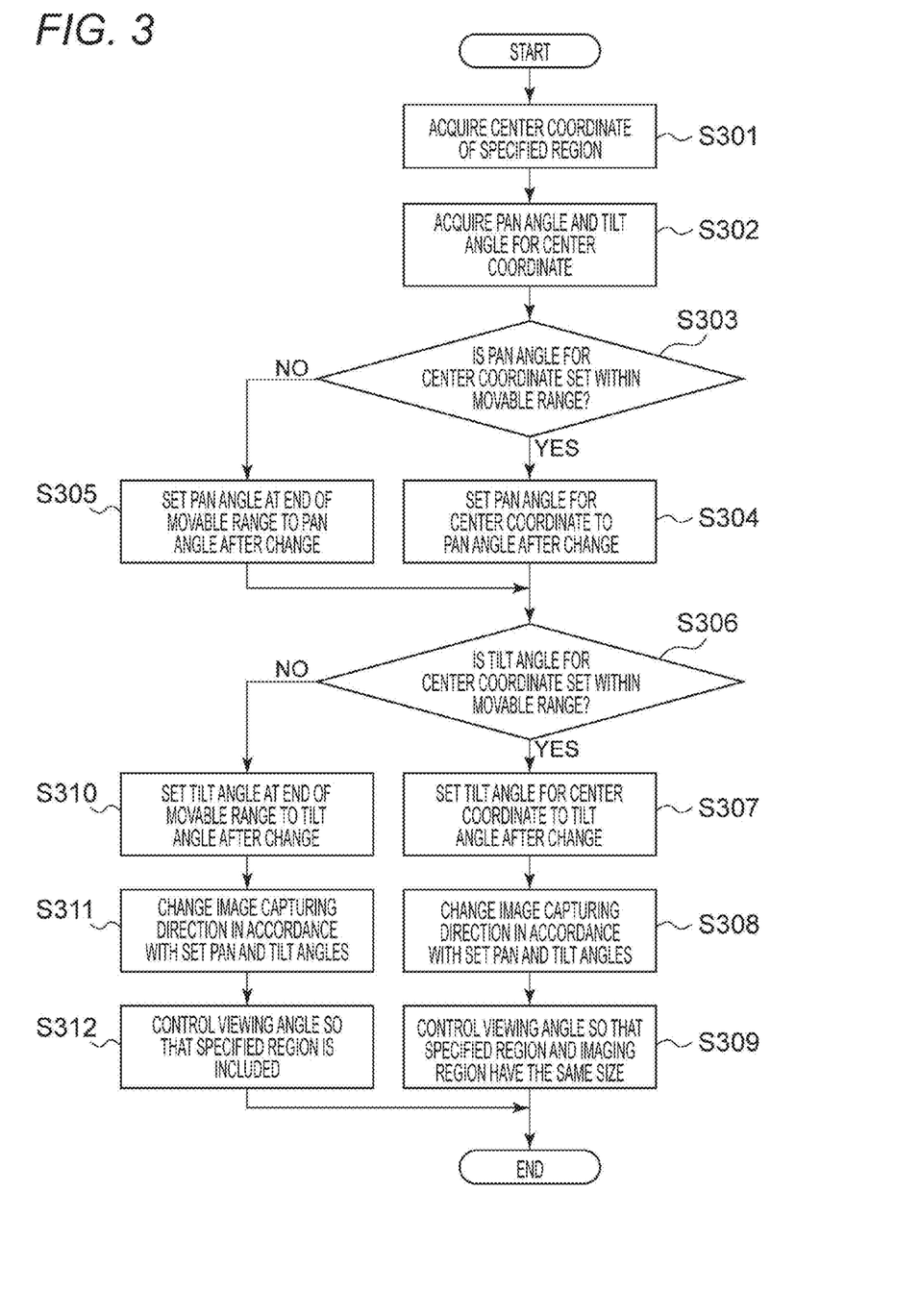
FIG. 3 is a flowchart illustrating a process to be performed by a control device according to the first embodiment.

In this embodiment, the process in the flowchart of FIG. 3 is executed by the client device 102. In this case, the flowchart of FIG. 3 expresses the process to be executed by the processing unit 122 of the client device 102. If the processing unit 122 of the client device 102 incorporates the processor, in the process illustrated in FIG. 3, the procedure illustrated in FIG. 3 is carried out by having the processing unit 122 develop the programs stored in the storage unit 127 and execute the programs. Alternatively, the process illustrated in FIG. 3 may be partly or entirely executed by the hardware.

In this embodiment, the client device 102 determines the image capturing direction and the viewing angle of the imaging unit 111 and instructs the server device 101 in accordance with the user operation; however, the present invention is not limited thereto. The process illustrated in FIG. 3 may be executed by the server device 101 on the camera side. In other words, upon the acceptance of the content of the user operation in the client device 102, the server device 101 may determine the image capturing direction and the viewing angle of the imaging unit 111 in accordance with the user operation and control the imaging unit 111 thereby. In this case, the process in the flowchart of FIG. 3 is executed by the control unit 117 of the server device 101. If the control unit 117 of the server device 101 incorporates the processor, in the process illustrated in FIG. 3, the procedure illustrated in FIG. 3 is carried out by having the control unit 117 develop the programs stored in the storage unit 118 and execute the programs. Alternatively, the process illustrated in FIG. 3 may be partly or entirely executed by the hardware.

First, a user sets the specified region 202 on the captured image displayed on the display region 201 and then the processing unit 122 acquires the value of the center coordinate of the specified region 202 (S301). The center coordinate refers to the coordinate on the coordinate system set in the display region 201. In this embodiment, the coordinate value of the center coordinate of the specified region 202 corresponds to the coordinate value of the point corresponding to the intersection between the diagonal lines of the specified region 202.

Next, the processing unit 122 acquires the pan angle and the tilt angle of the imaging unit 111 relative to the center coordinate acquired in Step S301 (S302).

Next, the processing unit 122 determines whether the value of the pan angle acquired in Step S302 is within the movable range or not (S303).

If the value of the pan angle corresponding to the center of the specified region 202 is included in the pan movable range of the imaging unit 111 (if YES in S303), the pan angle acquired in Step S302 is set to the pan angle after the change of the image capturing direction (S304).

On the other hand, if the value of the pan angle acquired in Step S302 is out of the pan movable range of the imaging unit 111 (if NO in S303), the pan angle of the imaging unit 111 after the change of the image capturing direction is set so as to be close to the pan angle acquired in Step S302 (S305). In this embodiment, the pan angle set in Step S304 is set to the end of the pan movable range of the imaging unit 111.

After the process of Step S304 or Step S305, the processing unit 122 determines whether the tilt angle acquired in Step S302 is included in the tilt movable range of the imaging unit 111 (S306).

Through the process of Step S302 and Step S306, the processing unit 122 determines whether the particular point in the specified region 202 is included in the predetermined region in the range where the imaging is possible by changing the viewing angle and image capturing direction of the imaging unit 111. In this embodiment, the predetermined region corresponds to the range where the center of the imaging region to be captured by the imaging unit 111 can be moved, and the particular point is the center of the specified region 202 but the present invention is not limited thereto. When the particular point is the point other than the center included in the specified region 202, the determination can be carried out similarly by setting the border of the predetermined region as appropriate.

If the value of the tilt angle corresponding to the center of the specified region 202 is included in the tilt movable range of the imaging unit 111 (if YES in S306), the tilt angle acquired in Step S302 is set to the tilt angle after the change of the image capturing direction (S307).

Setting the tilt angle in Step S307 causes the processing unit 122 to change the image capturing direction of the imaging unit 111 in accordance with the pan angle and the tilt angle set in Steps S304 and S307 (S308). Specifically, the processing unit 122 changes the image capturing direction of the imaging unit 111 by outputting the command to change the image capturing direction to the server device 101 through the communication control unit 121. In the example of FIG. 6A, the imaging region of the imaging unit 111 is changed from the imaging region 602 to the imaging region 603.

After the image capturing direction of the imaging unit 111 is changed in Step S308, the zoom value of the imaging unit 111 is determined and the viewing angle of the imaging unit 111 is controlled so that the subject in the specified region 202 is magnified and displayed in the entire display region 201 as illustrated in FIG. 2B (S309). In this embodiment, the zoom value is determined so that the specified region coincides with the imaging region after the change; however, the present invention is not limited thereto. For example, as described above, the aspect ratio of the specified region may be different from the aspect ratio of the captured image to be captured by the imaging unit 111, and the specified region may not necessarily coincide with the imaging region after the change. It is only required that the imaging region after the change corresponds to the specified region and for example, the imaging region after the change may include the specified region. For example, the zoom value of the imaging unit 111 is determined based on the size of the specified imaging region and the size of the imaging region captured by the imaging unit 111.

In the example illustrated in FIG. 6A, the viewing angle of the imaging unit 111 is controlled so that the size of the imaging region 603 is changed to be the size of the imaging region 605. The zoom value is determined based on the size of the specified region 604 and the size of the imaging region 605 before the zooming.

The processing unit 122 notifies the determined zoom value to the server device 101 through the communication control unit 121 and controls the viewing angle of the imaging unit 111. Instead of notifying the zoom value, the communication control unit 121 may notify the zoom magnification relative to the current zoom value.

If the value of the tilt angle acquired in Step S302 is out of the tilt movable range of the imaging unit 111 (if NO in S306), the tilt angle of the imaging unit 111 after the change of the image capturing direction is set so as to be close to the tilt angle acquired in Step S302 (S310). In this embodiment, the tilt angle set in Step S310 is set to the end of the tilt movable range of the imaging unit 111.

Setting the tilt angle in Step S310 causes the processing unit 122 to change the image capturing direction of the imaging unit 111 in accordance with the pan angle and the tilt angle set in Steps S305 and S310 (S311). Specifically, the processing unit 122 changes the image capturing direction of the imaging unit 111 by outputting the command to change the image capturing direction to the server device 101 through the communication control unit 121. In the example of FIG. 6B, the imaging region of the imaging unit 111 is changed from the imaging region 602 to the imaging region 603.

After the image capturing direction of the imaging unit 111 is changed in Step S311, the zoom value of the imaging unit 111 is determined and the viewing angle of the imaging unit 111 is controlled so that the magnified subject in the specified region 202 is displayed in the state being included in the display region 201 (S312).

In the example illustrated in FIG. 6B, the viewing angle of the imaging unit 111 is controlled so that the size of the imaging region 603 is changed to be the size of the imaging region 605. The zoom value is determined based on the position and viewing angle of the specified region. The processing unit 122 notifies the determined zoom value to the server device 101 through the communication control unit 121 and controls the viewing angle of the imaging unit 111.

Regardless of the physical restriction that the imaging unit 111 can change the image capturing direction, the viewing angle of the imaging device can be controlled so that the image of the subject in the specified region selected by the user is displayed in the display region 201.

Figure 4:
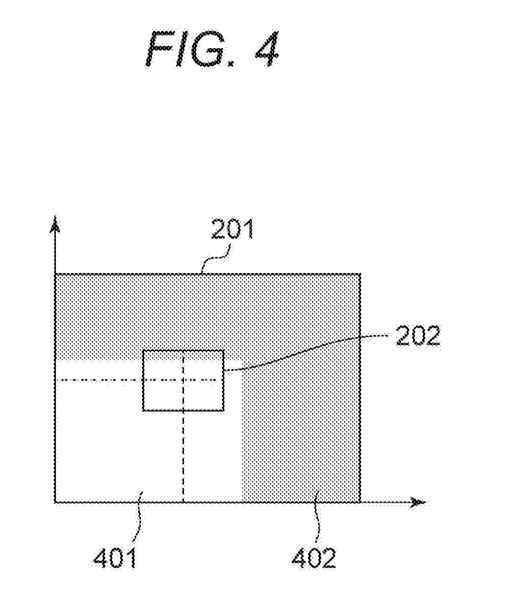
FIG. 4 is a diagram for describing a zooming process to be performed by the control device according to the first embodiment.
Figure 5A:
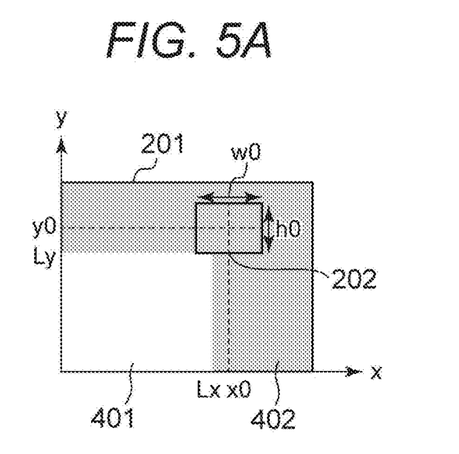
FIGS. 5A, 5B, and 5C are diagrams for describing a zooming process to be performed by the control device according to the first embodiment.
Figure 5B:
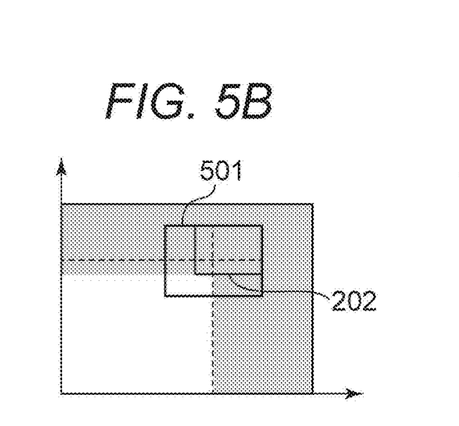
Figure 5C:
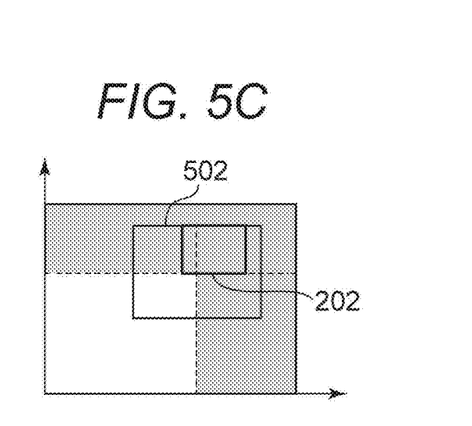

Next, description is made of the process for determining the zoom value with reference to FIG. 4 and FIG. 5. FIG. 4 illustrates an example in which the pan angle and the tilt angle of the center coordinate of the specified region 202 are in a movable range 401 where the center of the imaging region of the imaging unit 111 can be moved.

Of the entire display region 201 described with reference to FIG. 2A, the movable range 401 corresponds to the area expressed with a white color. An unmovable range 402 where the optical axis of the imaging unit 111 cannot be directed is the shaded area. In FIG. 4, the center of the specified region 202 (optical axis of the imaging) is in the camera movable range 401; therefore, the pan and the tilt can be controlled so that the center of the video captured by the camera is moved to the center of the specified region. In this case, based on the pan and tilt values calculated from the current zoom value and the positional relationship between the center of the display unit and the center of the area specifying frame, an operation command is generated and the command is transmitted from the communication control unit 121 to the server device 101. Another operation command is generated from the zoom value calculated based on the size ratio between the display unit 126 and the specified region 202, and is transmitted from the communication control unit 121 to the server device 101.

FIG. 5 illustrates an example in which the center of the specified region 202 is included in the unmovable range 402. Since the center of the specified region 202 is in the unmovable range 402 of the camera, the center of the video captured by the camera cannot be moved to the specified position. In view of this, the pan, tilt, and zoom values are calculated as below.

First, the lower left point of the display unit 126 is regarded as the original point, based on which the coordinate system is formed assuming the pan direction is the x axis and the tilt direction is the y direction. The upper limit value of the movable range of the pan angle is Lx, the upper limit of the movable range of the tilt angle is Ly, the center coordinate of the specified region 202 is (x0, y0), and the horizontal and vertical sizes are set to (w0, h0). The center of the zoom area determined finally is (X, Y) and the horizontal and vertical sizes thereof are (W, H). The initial state in this case is as follows:

$$(X, Y) = (x0, y0)$$

$$(W, H) = (w0, h0)$$

When the center of the specified region 202 is in the unmovable range 402 of the pan, i.e., if X>Lx, a new zoom area 501 is set as illustrated in FIG. 5B. Since the pan operates only in the movable range, the value X of the pan of the zoom area 501 is as follows:

$$X = Lx$$

For making the zoom area 501 contain the entire specified region 202, the following formulae are satisfied:

$$W = w0 + 2 \times (x0 - Lx)$$

$$H = W \times (h0/w0)$$

When the center of the zoom area 501 with the center coordinate (X, Y) and the size (W, H) determined as above is in the unmovable range 402 of the tilt, i.e., if Y>Ly, a new zoom area 502 is set as illustrated in FIG. 5C. Since the tilt operates only in the movable range, the tilt value Y of the zoom area 502 is as follows:

$$Y = Ly$$

The zoom area 502 is set to contain the entire specified region 202. If the size of the zoom area 501 is redefined as (w1, h1), the size (W, H) of the zoom area 502 is as below:

$$H = h1 + 2 \times (y0 - Ly)$$

$$W = H \times (w0/h0)$$

In this manner, the pan and tilt are controlled so that the specified region 202 comes to the calculated center position of the zoom area 502. The zoom value is controlled to the zoom value calculated based on the size ratio between the zoom area 502 and the specified region 202. In this manner, the zoom can be achieved so that the region specified by the user first is included.

The processing unit 122 controls the zoom value of the imaging unit 111 on the basis of the size (w0, h0) of the specified imaging region and the position of the imaging region (x0, y0) specified in the imaging possible range.

How to determine the zoom value described above is merely an example and any other way may be employed. In this embodiment, the center of the area specifying frame is out of the movable range of both the pan and the tilt. However, the same method is applicable to the case in which one of the pan and tilt is out of the movable range. In this embodiment, the zoom area is reset in the order of the pan and tilt but the order may be the tilt and pan.

Regardless of the physical restriction that the imaging unit 111 can change the image capturing direction, the viewing angle of the imaging device can be controlled so that the image of the subject in the specified region selected by the user is displayed in the display region 201.

In this embodiment, the zoom value is controlled so that the imaging region of the imaging unit 111 after the zoom value is changed includes the specified imaging region (specified region); however, the present invention is not limited thereto. The processing unit 122 may control the zoom value to suppress the non-inclusion of the specified imaging region in the imaging region of the imaging unit 111 after the zoom value is changed. Even if the imaging region of the imaging unit 111 after the zoom value is changed does not necessarily include the entire specified captured, the user can check the captured image in the desired region as long as the specified region is mostly captured.

The imaging region of the imaging unit 111 after the zoom value is changed may include other region than the specified imaging region. For example, if the aspect ratio of the specified region is different from the aspect ratio of the captured image captured by the imaging unit 111, the imaging region other than the specified region may be captured so that the imaging region includes the specified region.

The processing unit 122 may change the zoom value of the imaging unit 111 by selecting the zoom magnification from a plurality of predetermined zoom magnifications that are set in advance. If the particular point included in the specified imaging region is not included in the predetermined region, the processing unit 122 may select the higher zoom magnification for the specified region than the zoom magnification for the imaging region after the zoom value is changed. The particular point included in the specified region refers to, for example, the center of the specified region 604. The predetermined region refers to, for example, a predetermined region 701. The zoom magnification to be selected refers to the zoom magnification that suppresses the non-inclusion of the specified region in the imaging region after the zoom value is changed. The zoom magnification represents the ratio of the zoom value before and after the change. Based on the current zoom value and the selected zoom magnification, the zoom value after the change is determined.

In an embodiment below, the subject in the specified region 202 is displayed in the entire display region 201 as illustrated in FIG. 2B even if the image capturing direction of the imaging unit 111 cannot be changed so that the center of the imaging region of the imaging unit 111 coincides with the center of the specified region 202.

The processing unit 122 of the client device 102 according to this embodiment has a function of cutting out a part of the captured image acquired, magnifying the cutout image through the image processing and displaying the magnified image on the display unit 126. The other structures of the network system according to this embodiment are the same as those of the first embodiment described with reference to FIG. 1, so that the description is omitted.

When the viewing angle of the imaging unit 111 is controlled, the captured image corresponding to the imaging region 605 is displayed on the display unit 126 as described with reference to FIG. 6B in the above embodiment. In other words, the image in the region other than the specified region 604 is also displayed. In this embodiment, the image corresponding to the specified region 604 is cut out through the image processing from the captured image of the imaging region 605 in FIG. 6B and the cutout image is displayed on the display unit 126.

Figure 8:
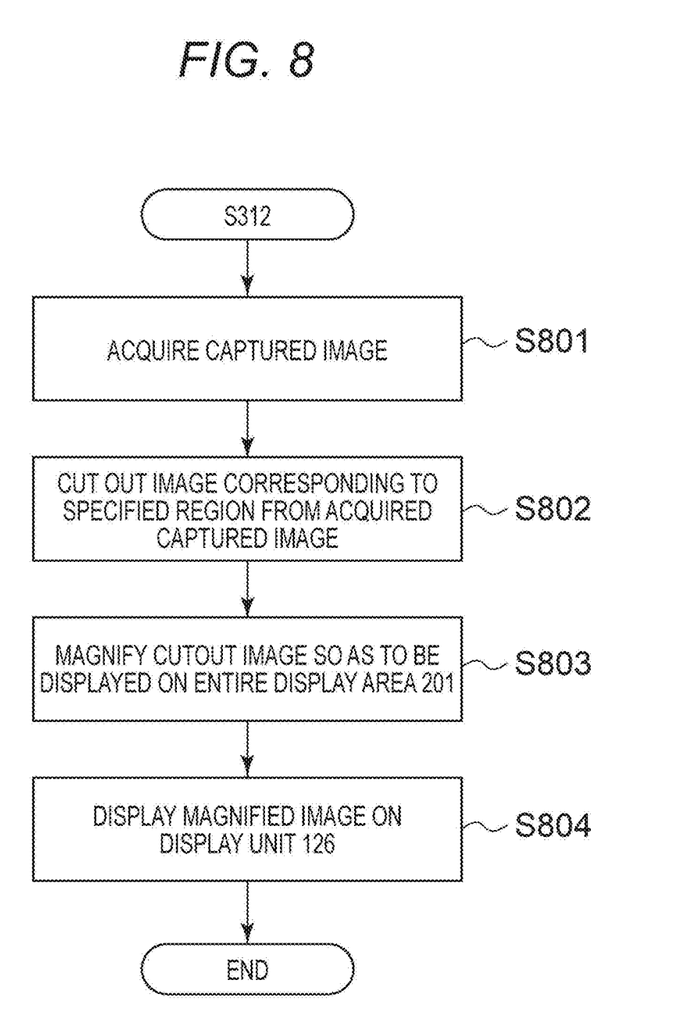
FIG. 8 is a flowchart illustrating a process to be performed by a control device according to a second embodiment.

In this embodiment, the processing unit 122 executes the process in Step S312 in FIG. 3 and then executes the process in Steps S801 to S804 in FIG. 8. If the processing unit 122 of the client device 102 incorporates the processor, in the process illustrated in FIG. 8, the procedure illustrated in FIG. 8 is carried out by having the processing unit 122 develop the programs stored in the storage unit 127 and execute the programs. Alternatively, the process illustrated in FIG. 8 may be partly or entirely executed by the hardware.

First, the processing unit 122 acquires the captured image captured by the imaging unit 111 after the process in Step S312 (S801). Next, the processing unit 122 performs the image processing and cuts out the image (cutout image) corresponding to the specified region from the acquired image (S802). Next, the processing unit 122 performs the image processing to magnify the cutout image so that the captured image cut out in Step S802 is displayed in the entire display region 201 (S803). The processing unit 122 controls the display control unit 125 to display the magnified image on the display unit 126.

In this manner, even if the image capturing direction of the imaging unit 111 cannot be changed so that the center of the imaging region of the imaging unit 111 coincides with the center of the specified region 202, the subject in the specified region 202 can be displayed in the entire display region 201.

The process described with reference to FIG. 8 is executed by the client device 102 here; however, the process illustrated in FIG. 8 may be executed by the control unit 117 of the server device 101 in a manner similar to the first embodiment, in which case the similar effect can also be obtained.

In an embodiment below, the display mode of the frame representing the specified region 202 in the display region 201 is changed depending on whether the center of the specified region 202 is included in the predetermined region 701.

In this embodiment, the display control unit 125 controls to change the display mode of the frame representing the specified region 202 in the display region 201 depending on whether the center of the specified region 202 is included in the predetermined region 701. The other structures of the network system according to this embodiment are the same as those of the first embodiment described with reference to FIG. 1, so that the description is omitted.

The processing unit 122 of the client device 102 determines whether the particular point (for example, center point) included in the specified region 202 specified by the user is included in the predetermined region through the procedure similar to that of the process described in Steps S302 and S306 of FIG. 3.

If it has been determined that the particular point included in the specified region 202 is included in the predetermined region, the display control unit 125 displays the frame representing the specified region 202 on the display unit 126. On the other hand, if it has been determined that the particular point included in the specified region 202 is not included in the predetermined region, the display control unit 125 does not display the frame representing the specified region 202 on the display unit 126. In this case, neither the image capturing direction nor the viewing angle of the imaging unit 111 is controlled. Thus, the user is notified of the fact that the zoom of the specified region 202 is impossible. The viewing angle in this embodiment refers to the size of the imaging region to be captured by the imaging unit 111 in one image capturing direction, which is similar to the first embodiment.

Besides the method in which the specified region 202 is not displayed, another method is applicable in which: the color of the frame representing the specified region 202 is changed to be different between when the particular point included in the specified region 202 is included in the predetermined region and when the particular point included in the specified region 202 is not included in the predetermined region. In this case, the image capturing direction and the viewing angle of the imaging unit 111 are controlled even if the particular point is not included in the predetermined region, which is similar to the first or second embodiment. Instead of changing the color of the specified region 202, an icon or a message may be displayed, for example.

This can notify the user, if the particular point included in the specified region 202 is not included in the predetermined region, that the captured image displayed on the display region 201 after the zooming process includes other region in addition to the specified region 202.

In the second embodiment, if the particular point included in the specified region 202 is not included in the predetermined region, the user can be notified of the fact that the captured image on the display region 201 after the zooming process is the image that is magnified or cut out through the image processing.

Although the embodiments of the present invention have been described so far, the present invention is not limited by the above embodiments and various modifications and changes can be made within the content of the present invention. The process described in each embodiment can be executed in combination as appropriate.

(Another Embodiment)

The present invention can be embodied by the process in which a program for achieving one or more functions in any of the above embodiments is supplied to a system or a device through a network or a storage medium and read out and executed by one or more processors in a computer of the system or the device. The program can be executed by a circuit with one or more functions (such as ASIC).

According to such a structure, the imaging region of the imaging unit can be controlled so that the image of the subject in the region selected by the user can be displayed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-232192, filed Nov. 14, 2014, which is hereby incorporated by reference herein in its entirety.

What is claimed is:

1. A control device comprising:
an acceptance unit configured to accept a specification of a specified region on a display screen of a display unit which displays an image captured by an imaging unit;
a determination unit configured to determine an image capturing direction and a zoom magnification for the specified region accepted by the acceptance unit; and
a control unit configured to control the imaging unit on the basis of the image capturing direction and the zoom magnification determined by the determination unit,
wherein, in a coordinate system in which x denotes a pan direction and y denotes a tilt direction, when an upper limit value of a movable range in the pan direction is defined as Lx, when a center coordinate of the specified region is defined as (x0, y0) and horizontal and vertical sizes thereof are defined as (w0, h0), and when a center of an imaging region determined finally is defined as (X, Y) and horizontal and vertical sizes thereof are defined as (W, H),
the control unit changes the image capturing direction of the imaging unit such that equations of (X, Y)=(x0, y0), (W, H)=(w0, h0) hold in a case where the center of the specified region is within the movable range in the pan direction of the imaging unit, and
the control unit changes the image capturing direction of the imaging unit such that equations of X=Lx, W=w0+ 2×(x0−Lx), H=W×(h0/w0) hold in a case where the center of the specified region is not within the movable range in the pan direction of the imaging unit,
wherein the acceptance unit is realized by a processor or a combination of the processor and software,
wherein the determination unit is realized by a processor or a combination of the processor and software, and
wherein the control unit is realized by a processor or a combination of the processor and software.

2. The control device according to claim 1,
wherein, in the case where the imaging unit is unable to be directionally changed into the image capturing direction determined by the determination unit due to a physical restriction on driving of the imaging unit, the control unit restricts the zoom magnification of the imaging unit to be the zoom magnification lower than the zoom magnification determined by the determination unit so that the specified imaging-region is included in a viewing angle to be captured by the imaging unit.

3. The control device according to claim 1,
wherein, in the case where the imaging unit is unable to be directionally changed into the image capturing direction determined by the determination unit due to a physical restriction on driving of the imaging unit, the control unit restricts the zoom magnification to be the highest zoom magnification among the zoom magnifications for making the specified region included in the viewing angle captured by the imaging unit.

4. The control device according to claim 1,
wherein, in the case where the imaging unit is unable to be directionally changed into the image capturing direction determined by the determination unit due to a physical restriction on driving of the imaging unit, the control unit displays on the display screen of the display unit, a cutout image obtained by cutting a part of the imaging region corresponding to the specified region in the captured image captured by the imaging unit at a zoom magnification lower than the zoom magnification determined by the determination unit.

5. The control device according to claim 4, further comprising
an image processing unit configured to change a size of the cutout image,
wherein the image processing unit magnifies the cutout image and displays the magnified image on the display screen of the display unit,
wherein the image processing unit is realized by a processor or a combination of the processor and software.

6. The control device according to claim 1,
wherein the control unit changes a display mode of an image representing the specified region depending on whether the image capturing direction determined by the determination unit is unable to be directionally changed due to a physical restriction on driving of the imaging unit.

7. The control device according to claim 1,
wherein the determination unit determines the image capturing direction of the imaging unit with reference to a center of a viewing angle of the imaging unit.

8. The control device according to claim 1,
wherein the acceptance unit accepts the specification of the specified region by illustration of a rectangular shape.

9. The control device according to claim 1,
wherein the acceptance unit accepts the specification of the specified region from a terminal device connected to the control device through a network.

10. The control device according to claim 1, further comprising:
a reception unit configured to receive the captured image captured by the imaging unit through a network,
wherein the control unit controls the zoom magnification of the imaging unit through the network,
wherein the reception unit is realized by a processor or a combination of the processor and software.

11. A control method for a control device, comprising:
an acceptance step of accepting a specification of a specified region on a display screen of a display unit which displays an image captured by an imaging unit;
a determination step of determining an image capturing direction and a zoom magnification for the specified region accepted in the acceptance step; and
a control step of controlling the imaging unit on the basis of the image capturing direction and the zoom magnification determined by the determination step,
wherein, in a coordinate system in which x denotes a pan direction and v denotes a tilt direction, when an upper limit value of a movable range in the pan direction is defined as Lx, when a center coordinate of the specified region is defined as (x0, y0) and horizontal and vertical sizes thereof are defined as (w0, h0), and when a center of an imaging region determined finally is defined as (X, Y) and horizontal and vertical sizes thereof are defined as (W, H), the control step changes the image capturing direction of the imaging unit such that equations of (X, Y)=(x0, y0), (W, H)=(w0, h0) hold in a case where the center of the specified region is within the movable range in the pan direction of the imaging unit, and the control step changes the image capturing direction of the imaging unit such that equations of X=Lx, W=w0+2×(x0−Lx), H=W×(h0/w0) hold in a case where the center of the specified region is not within the movable range in the pan direction of the imaging unit, wherein the acceptance step is executed by a processor or a combination of the processor and software, wherein the determination step is executed by a processor or a combination of the processor and software, and wherein the control step is executed by a processor or a combination of the processor and software.

12. The control method for a control device according to claim 11, wherein, in the control step, in the case where the imaging unit is unable to be directionally changed into the image capturing direction determined in the determination step due to a physical restriction on driving of the imaging unit, a cutout image obtained by cutting a part of the imaging region corresponding to the specified region in the captured image captured by the imaging unit is displayed on the display screen of the display unit at a zoom magnification lower than the zoom magnification determined in the determination step.

13. A non-transitory computer-readable storage medium storing a program for executing a control method for a control device, the control method comprising:

an acceptance step of accepting a specification of a specified region on a display screen of a display unit which displays an image captured by an imaging unit;

a determination step of determining an image capturing direction and a zoom magnification for the specified region accepted in the acceptance step; and a control step of controlling the imaging unit on the basis of the image capturing direction and the zoom magnification determined by the determination step, wherein, in a coordinate system in which x denotes a pan direction and v denotes a tilt direction, when an upper limit value of a movable range in the pan direction is defined as Lx, when a center coordinate of the specified region is defined as (x0, y0) and horizontal and vertical sizes thereof are defined as (w0, h0), and when a center of an imaging region determined finally is defined as (X, Y) and horizontal and vertical sizes thereof are defined as (W, H), the control step changes the image capturing direction of the imaging unit such that equations of (X, Y)=(x0, y0), (W, H)=(w0, h0) hold in a case where the center of the specified region is within the movable range in the pan direction of the imaging unit, and the control step changes the image capturing direction of the imaging unit such that equations of X=Lx, W=w0+2×(x0−Lx), H=W×(h0/w0) hold in a case where the center of the specified region is not within the movable range in the pan direction of the imaging unit, wherein the acceptance step is executed by a processor or a combination of the processor and software, wherein the determination step is executed by a processor or a combination of the processor and software, and wherein the control step is executed by a processor or a combination of the processor and software.

14. The non-transitory computer-readable storage medium storing a program for executing a control method for a control device according to claim 13, wherein, in the control step, in the case where the imaging unit is unable to be directionally changed into the image capturing direction determined in the determination step due to a physical restriction on driving of the imaging unit, a cutout image obtained by cutting a part of the imaging region corresponding to the specified region in the captured image captured by the imaging unit is displayed on the display screen of the display unit at a zoom magnification lower than the zoom magnification determined in the determination step.

15. A control device comprising:

an acceptance unit configured to accept a specification of a specified region on a display screen of a display unit which displays an image captured by the imaging unit;

a determination unit configured to determine an image capturing direction and a zoom magnification for the specified region accepted by the acceptance unit; and a control unit configured to control the imaging unit on the basis of the image capturing direction and the zoom magnification determined by the determination unit, wherein, in a coordinate system in which x denotes a pan direction and y denotes a tilt direction, when an upper limit value of a movable range in the tilt direction is defined as Ly, when a center coordinate of the specified region is defined as (x0, y0) and horizontal and vertical sizes thereof are defined as (w0, h0), and when a center of an imaging region determined finally is defined as (X, Y) and horizontal and vertical sizes thereof are defined as (W, H), the control unit changes the image capturing direction of the imaging unit such that equations of (X, Y)=(x0, y0), (W, H)=(w0, h0) hold in a case where the center of the specified region is within the movable range in the tilt direction of the imaging unit, and the control unit changes the image capturing direction of the imaging unit such that equations of Y=Ly, H=h1+2×(y0−Ly), W=H×(w0/h0) hold in a case where the center of the specified region is not within the movable range in the pan direction of the imaging unit, wherein the acceptance unit is realized by a processor or a combination of the processor and software, wherein the determination unit is realized by a processor or a combination of the processor and software, and wherein the control unit is realized by a processor or a combination of the processor and software.

* * * * *